US009431663B2

(12) United States Patent
De Miranda et al.

(10) Patent No.: US 9,431,663 B2
(45) Date of Patent: Aug. 30, 2016

(54) METHOD FOR THE DIRECT OXIDATION AND/OR INTERNAL REFORMING OF ETHANOL, SOLID OXIDE FUEL CELL FOR DIRECT OXIDATION AND/OR INTERNAL REFORMING OF ETHANOL, CATALYST AND MULTIFUNCTIONAL ELECTROCATALYTIC ANODE FOR DIRECT OXIDATION AND/OR INTERNAL

(76) Inventors: Paulo Emilio Valadao De Miranda, Rio de Janeiro (BR); Selma Aparecida Venancio, Rio de Janeiro (BR); Hugo Vilela De Miranda, Rio de Janeiro (BR)

( * ) Notice: Subject to any disclaimer, the term of this patent is extended or adjusted under 35 U.S.C. 154(b) by 718 days.

(21) Appl. No.: 13/378,139

(22) PCT Filed: Jun. 11, 2010

(86) PCT No.: PCT/BR2010/000188
§ 371 (c)(1),
(2), (4) Date: Dec. 14, 2011

(87) PCT Pub. No.: WO2010/144979
PCT Pub. Date: Dec. 23, 2010

(65) Prior Publication Data
US 2012/0088176 A1 Apr. 12, 2012

(30) Foreign Application Priority Data
Jun. 17, 2009 (BR) .................................. 0901921

(51) Int. Cl.
*H01M 8/04* (2016.01)
*H01M 8/10* (2016.01)
*H01M 4/90* (2006.01)
*B01J 23/10* (2006.01)
*B01J 23/00* (2006.01)
*H01M 8/12* (2016.01)

(52) U.S. Cl.
CPC .......... *H01M 4/9033* (2013.01); *B01J 23/002* (2013.01); *H01M 8/1013* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS

| 6,361,757 | B1 | 3/2002 | Shikada et al. |
| 6,492,050 | B1* | 12/2002 | Sammes ....................... 429/423 |
| 7,378,370 | B2 | 5/2008 | Cai et al. |
| 2002/0168560 | A1* | 11/2002 | Mukerjee ............ H01M 8/2415 429/410 |
| 2003/0035989 | A1 | 2/2003 | Gorte et al. |
| 2004/0026668 | A1 | 2/2004 | Kuroda et al. |

(Continued)

FOREIGN PATENT DOCUMENTS

GB    2 424 878    10/2006

OTHER PUBLICATIONS

Ye, Preparation and performance of a Cu—CeO2—SCSZ composite anode for SOFCs running on ethanol fuel, Nov. 27, 2006, J Power Sources, 164, 203-209.*

(Continued)

*Primary Examiner* — Daniel Gatewood
(74) *Attorney, Agent, or Firm* — Fildes & Outland, P.C.

(57) ABSTRACT

The present invention relates to the direct oxidation and/or internal reforming of ethanol and/or mixtures of ethanol and water, in a solid oxide fuel cell, with multifunctional electrocatalytic anodes having specific features, on the basis of mixed oxides and metal oxides and catalysts, preferably with a perovskite-like crystalline structure.

23 Claims, 5 Drawing Sheets (a)

(b)

(56) References Cited

U.S. PATENT DOCUMENTS

2005/0202159 A1* 9/2005 Svoboda ............ H01M 4/8621
427/115
2009/0087698 A1* 4/2009 Huth et al. ...................... 429/13

OTHER PUBLICATIONS

Tagawa, Mechanistic aspects of oxidative coupling of methane over LaAlO3, 1988, 84, 923-926.*
Venancio, Direct oxidation of ethanol in SOFC anodes, Aug. 10, 2008, Revista Materia, 13, 560-568.*
Venâncio et al.; "Oxidação direta do etanol no anodo de PaCOS"; Revista Matéria, v. 13, n. 3, pp. 560-568 (2008); see the whole document.
Ye et al.; "Preparation and performance of a Cu—CeO$_2$ScSZ composite anode for SOFCs running on ethanol fuel"; Journal of Power Sources 164 (2007) 203-209; see the whole document.
Lu et al.; "Development of solid oxide fuel cells for the direct oxidation of hydrocarbon fuels"; Solid State Ionics 152-153 (2002) 393-397; see pp. 394, 395 and 396.
Jung et al.; "Influence of composition and Cu impregnation method on the performance of Cu/CeO$_2$/YSZ SOFC anodes"; Journal of Power Sources 154 (2006) 42-50, see the whole document.
Sun et al.; "Recent anode advances in solid oxide fuel cells"; Journal of Power Sources 171 (2007) 247-260, pp. 248, 250, 251 and 252.
Laosiripojana et al.; "Catalytic steam reforming of dimethyl ether (DME) over high surface area Ce—ZrO$_2$ at SOFC temperature: The possible use of DME in indirect internal operation (IIR-SOFC)"; Applied Catalysis A: General 320 (2007) 105-113; see pp. 11 to 113.
Profeti et al.; "Production of hydrogen via steam reforming of biofuels on Ni/CeO$_2$—Al$_2$O$_3$ catalysts promoted by noble metals"; International Journal of Hydrogen Energy 34 (2009) 5049-5060; see pp. 5054 to 5057.
Martins et al.; "Estudo da Produção de Suspensões Aquosas para Serigrafia de Anodos para PaCOS e Intodução de Modificadores de Superfície"; Revista Matéria, v. 12, n. Y, pp. 93-98, (2007).

\* cited by examiner (a)

(b)

(c)

(d)

(a)

(b)

(c)

(d)

(a)

(b)

METHOD FOR THE DIRECT OXIDATION AND/OR INTERNAL REFORMING OF ETHANOL, SOLID OXIDE FUEL CELL FOR DIRECT OXIDATION AND/OR INTERNAL REFORMING OF ETHANOL, CATALYST AND MULTIFUNCTIONAL ELECTROCATALYTIC ANODE FOR DIRECT OXIDATION AND/OR INTERNAL

TECHNICAL FIELD

The present invention relates to the direct oxidation and/or internal reforming of ethanol in a solid oxide fuel cell (SOFC) with anode electrocatalysts special functionality that have catalytic or electrocatalytic electrochemical resistance to carbon deposition and selective competitive catalytic action, through chemical reactions that compete with the generation of electrons in electrochemical reactions, the degree of electrocatalytic activity, which influences the electrochemical performance and can facilitate the direct oxidation or reforming complex internal fuel such as ethanol or mixtures ethanol-water at the anode of the fuel cell in order to produce electricity and/or possibly even catalytic conversion/electrocatalytic specific, resulting in the production of ethylene.

DIRECT OXIDATION AND/OR INTERNAL REFORMING OF ETHANOL IN SOLID OXIDE FUEL CELLS

The solid oxide fuel cell (SOFC) are considered promising for the generation of electricity due to its high efficiency, low cost and fuel flexibility. Many fuels have been suggested as potentially applicable for SOFCs and among them, ethanol is presented as very attractive because it is a liquid fuel storage easy and safe, it is renewable and can be produced from various biomass sources, including power plants, contains the OH group, which facilitates the process of direct oxidation and/or internal reform, in addition, ethanol can be easily mixed with the required amount of water and vaporized to generate electricity.

SOFC can operate being fed directly to ethanol without the need for external reform, provided it has functionality specific to this anode. If this condition met, a power generation system with direct feed from ethanol or ethanol-water mixtures in a SOFC can be simple and targeted at portable applications, mobile or stationary. Such a system has the advantages of operating with high efficiency and without the production of pollutants such as $NO_x$ and $SO_x$, with reduced $CO_2$ emissions.

For direct oxidation in SOFCs, ethanol is electrochemically oxidized at the electrocatalytic anode, according to the reactions shown as below:

Cathode $3O_2+12e^-=6O^{2-}$

Anode $C_2H_5OH+6O^{2-}=2CO_2+3H_2O+12e^{31}$ (direct oxidation reaction)

total $C_2H_5OH+3O_2=2CO_2+3H_2O$

Many efforts have been made to understand and make ethanol electrooxidation on anode electrocatalyst surface and define the mechanism of occurrence. The route is desired that oxidizes ethanol directly to $CO_2$, with the production of $12e^-$, which results in the greatest amount of electrons and, consequently, more energy released.

Alternatively, ethanol can be reformed internally in SOFCs, followed by electrochemical oxidation of hydrogen and carbon monoxide. In this case, the reactions are as follows:

Cathode $3O_2+12e^-=6O^{2-}$

Anode $C_2H_5OH+3H_2O=2CO_2+6H_2$ (reforming reaction)

$C_2H_5OH+H_2O=2CO+4H_2$ $CO+O^{-2}=CO_2+2e^{31}$ $6H_2+6O^{2-}=6H_2O+12e^-$ (electrochemical reaction)

total $C_2H_5OH+3O_2=2CO_2+3H_2O$

The main mechanisms involve the reactions of dehydration or dehydrogenation of ethanol. The dehydration reaction produces ethylene as an intermediary and water, as shown:

Dehydration::$C_2H_5OH=C_2H_4+H_2O$

Dehydrogenation::$C_2H_5OH=CH_3+CHO+H_2$

SOFC operating directly on fuels such as hydrogen, hydrocarbons, ethanol or ethanol-water mixtures generates heat during operation. Douvartzides, S. et al. in "Exergy analysis of a solid oxide fuel cell power plant fed either with ethanol or methane" Journal of Power Sources, V-131, pages 224-230, and in 2004, "Electricity from ethanol fed SOFCs: the expectations for sustainable development and technological benefits" International Journal of Hydrogen Energy, V.29, pages 375-379, 2004, observed that when the SOFC is fed with ethanol achieves a theoretical efficiency in the range 84 to 93%, operating under free carbon between 800 and 1200K. This efficiency classifies ethanol as a fuel option more viable for SOFCs that gasoline and methanol.

Cermet Ni-ZEI (zirconia stabilized with 8 mol % yttria) is the most applied in SOFC anode because it has good activity for oxidation of hydrogen in the cell operating conditions. However, the use of nickel catalysts at the anode of a SOFC fed directly to hydrocarbons and alcohols, resulting in cell degradation due to deposition of carbon. Consequently, the development of anode materials resistant to carbon deposition is an important technological goal. Additionally, in the specific case of ethanol, it is necessary to achieve high anode potential to break the C—C bond, thus promoting the full oxidation of ethanol to $CO_2$. Gort et al., In "Novel SOFC anodes for the direct electrochemical oxidation of hydrocarbons" Journal of Catalysis V.216, pages 477-486, 2003, reported in their work, for example, that the problem of carbon deposition observed in anodes Ni-based anodes can be avoided by using Cu-ZEI at intermediate temperatures. Copper has high electronic conductivity and low catalytic activity for carbon formation and, therefore, is chosen to replace the nickel. These researchers have focused their attention on developing anodes resistant to carbon deposition of nickel by replacing copper and $CeO_2$. According to these researchers, "Recent developments on anodes for direct fuel utilization in SOFC", Solid State Ionics V. 175, pages 1-6, 2004, copper has some limitations, for example, the low catalytic activity for oxidation of hydrocarbon fuels and alcohols. Thus, it is necessary to functionalize the anode through the manufacture of a composite in which the electronic conduction should be ensured by copper and a different material to promote the catalytic activity for fuel oxidation. In this anode, the ceria is added as a catalyst for the oxidation of fuel and also to present mixed conductivity in its reduced form, which allows the transfer of oxygen ions from the electrolyte to the catalytic surface and assists charge transfer processes at the boundary triple phase.

Wen T. L et al. In "Preparation and performance of the Cu—CeO$_2$—ScSZ composite anode for SOFCs running on ethanol fuel" Journal of power sources V.164, pages 203-209, 2007, have been researching SOFC anodes with Cu—CeO$_2$—ScSZ (ScSZ which represents zirconia stabilized with scandium) for operation with ethanol. The results obtained by these researchers was very satisfactory, since the maximum power density obtained for SOFCs operated with vaporized ethanol was 2.22, 1.39 and 0.94 kW·m$^{-2}$ to 800, 750 and 700° C., respectively.

The proposal of this patent is based on the development of a catalyst and a ceramic anode electrocatalyst that have catalytic activity, electrocatalytic and electrochemical for the direct oxidation and/or internal reforming of ethanol and/or ethanol/water mixture, and may also allow to obtain C$_2$ hydrocarbons such as ethylene by dehydration of ethanol, and each reaction depends on the development of the catalyst by doping concentration and with different chemical elements, and the manufacturing process of the anode and the operating conditions of the fuel cell solid oxide, which includes concentration and pressure, relative fuel/oxidizer, and the ratio ethanol/water or the use of pure ethanol. Alternatively, in the Patent PI 0405676-0 A, Brazil (17 Oct. 2006 (RPI 1867) analyzes the use of electrocatalysts obtained by spontaneous deposition of platinum nanoparticles on Ru, Mn, Fe, Co, Rh, Pd, Os, Ir, Mo, Cr, V, W, Sn, U and rare earths, or a mixture of these elements, supported on carbon of high surface area, or by deposition of one or more of these elements on platinum nanoparticles supported on carbon of high surface area, as anode for the oxidation of alcohols, especially methanol and ethanol in the fuel cell electrolyte proton exchange membrane. This type of fuel cell, unlike SOFCs, operates at low temperatures and usually requires the use of noble metal electrocatalysts consisting of or containing in its composition, which is not required for the development of anodes for SOFCs due to its high operating temperature. For example, a key factor in obtaining special anodes for SOFCs is mainly the fabrication procedure that allows producing it as a component nanostructure. In the patent PI0601210-8, describes the procedures for the fabrication of nanostructured anodes for SOFCs. In another patent, PI0803895-3, is brought to life the composition and method of manufacture of anodes for SOFCs, also nanostructured, in which you can perform the direct oxidation of methane and methane-rich gas to produce electricity, but also for electrochemical conversion of methane to C$_2$ hydrocarbons, mainly ethylene, through reactions of direct oxidation of methane in the SOFC anode.

SUMMARY OF THE INVENTION

The main challenge for the direct oxidation and/or internal reform of ethanol to be commercially feasible in SOFC is to find efficient anodes electrocatalysts for the process of oxidation and that they can overcome all the constraints imposed by traditional Ni-anode ZEI. Find multifunctional anode electrocatalysts that are designed for specific functions, in addition to features already commonly required of an anode, which facility to include percolation of gases, and high catalytic activity in the electrocatalytic operating temperature and good electronic and ionic conductivities. These functions relate to specific features that can be of two types: 1) functionality related to materials and mechanical properties: type, quantity, distribution and stability of these phases and phases that may form in the manufacturing procedures and use; segregation and coalescence of particles and chemicals, mechanical stability, achieved by the production of anode layers with different compositions or through the use of materials on the anode and the electrolyte with coefficients of thermal expansion and contraction values close to, 2) catalytic functionality, electrochemical or electrocatalytic: resistance to selective deposition of carbon, which has the effect of disabling the electrocatalyst, competitive catalytic action, through chemical reactions that compete with the generation of electrons in electrochemical reactions, the degree of electrocatalytic activity, which influences the electrochemical performance. However, SOFC anodes can also be cross-functional, enabling the direct oxidation and/or internal reforming fuel complex, in addition to hydrogen, acting for the co-production of chemicals, to perform the electrochemical conversion of fuel in a chemical interest, in addition to co-produce electricity and heat.

The SOFCs are composed of clusters of low power battery unit. These groupings, in turn, can also be connected in series or in parallel to increase the installed power or the power generated. This feature provides great flexibility for scaling power and ease of maintenance of fuel cells. It is therefore object of the present invention to provide a process for the direct oxidation and/or internal reform of ethanol or ethanol/water mixture fuel cells using solid oxide, characterized in that it uses a fuel cell comprising a solid oxide anode multifunctional electrocatalyst composition-based mixed oxide and oxides of metals such as copper (CuO or Cu$_2$O), cerium (CeO$_2$), yttria stabilized zirconia (Zr$_2$O$_3$—Y$_2$O$_3$) and cerium aluminate (Ce$_{1-x}$M$_x$Al$_{1-y}$N$_y$O$_3$), where M corresponds to an element among Sr and Ca, and x represents about a former content in the range 0 to 50 mol %, N corresponds to an element from among Mn, Cr, Co, and y is approximately in the range of content 0 to 50 mol %, the fuel cell is fed fuel complex mixtures such as ethanol or ethanol-water to produce electricity, heat, water and/or possibly through direct oxidation ethylene and/or internal reform.

In a preferred realization of the process, the liquid fuel supplied to the fuel cell is selected from ethanol, ethanol/water mixture or other alcohols.

In another embodiment of the preferred process, the fuel cell is operated at a temperature in the range 600 to 1000° C.

In another embodiment of the preferred process, the electric power is generated simultaneously by means of electrochemical conversion of chemical energy into electrical energy with high efficiency during the oxidation of ethanol produces 12 electrons per molecule and/or through internal reform.

In another embodiment of the preferred process, the fuel cell has high efficiency without the production of pollutants such as NO$_x$ and SO$_x$ and CO$_2$ emissions reduced.

In another embodiment of the preferred process, the fuel cell is operated with gas flow rates fuel/oxidant variables (0.5:1 to 3:1 and 2:1 to 1:3).

In another embodiment of the preferred process, the fuel cell is operated with fuel pre-heating.

In another embodiment of the preferred process, the fuel cell is operated with fuel vapor.

In another embodiment of the preferred process, the fuel cell is operated directly with a mixture of ethanol:water (mol) in a ratio ranging from 1:0 to 1:5.

In another embodiment of the preferred process, the fuel cell is operated with pure ethanol.

In another preferred realization of the process are preferably produced hydrocarbons such as ethylene, heat and electricity simultaneously through the association of ethanol and water.

It is also object of the present invention proposes a cell solid oxide fuel used for the direct oxidation and/or internal reform of ethanol and/or ethanol/water mixture, characterized by comprising an anode electrocatalyst with multifunctional chemical-based mixed oxides and oxides of metals such as copper (CuO and $Cu_2O$), cerium ($CeO_2$), $Zr_2O_3$— $Y_2O_3$ and cerium aluminate ($Ce_{1-x}M_xAl_{1-y}N_yO_3$), where M corresponds to an element among Sr and Ca; x former represents about content in the range 0 to 50 mol %, N corresponds to an element among Mn, Cr, Co, and y represents approximately a content in the range 0 to 50 mol %, the stack is fed with fuel complex, such as ethanol and/or ethanol/water mixture to produce electricity, heat, water and/or possibly also by direct oxidation ethylene and/or internal reform.

In a preferred realization of the fuel cell, its functionality has gradually cathode made of a composite material $La_{0.8}Sr_{0.2}MnO_{3+\delta}/Zr_2O_3$—$Y_2O_3$ (LSM/ZEI), the first layer consists of a functional film cathode of LSM/ZEI (20-50/80-50% by mass) and a second cathode LSM ($La_{0.8}Sr_{0.2}MnO_3$), and may have other compositions, and works with $O_2$ oxidants selected from air, pure $O_2$ or other gas mixtures $O_2$ and its rich electrolyte is ZEI (zirconia stabilized with 8 mol % yttria).

In a preferred realization of the fuel cell, it has at least one of the settings: supported by the electrolyte, the anode or the cathode.

In a preferred realization of the fuel cell, the electrolyte is conductive to oxygen $O^{2-}$ ions or protons, $H^+$.

In a preferred realization of the fuel cell, not supported by the electrolyte, the electrolyte is presented in the form of a film, and the cell operated in a temperature range between 600 to 800° C.

In a preferred realization of the fuel cell, the anode presents electrochemical and electrocatalytic activity for oxidation of ethanol and ethanol-water mixtures.

In a preferred realization of the fuel cell, the anode provides catalytic function, electrocatalytic or electrochemical resistance to selective deposition of carbon.

In another preferred realization of the fuel cell, the anode multifunctional displays high electrochemical and electrocatalytic activity for the internal reforming of ethanol and ethanol-water mixtures.

In a preferred realization of the fuel cell, the anode multifunctional displays selectivity for the production of hydrocarbons such as ethylene.

It is also object of the present invention to provide a catalyst for the production of electricity from fuel ethanol used in fuel cell anodes of solid oxide, characterized by being made the basis of mixed oxides of cerium aluminate ($Ce_{1-x}M_xAl_{1-y}N_yO_3$), where M corresponds to an element among Sr and Ca, and x represents about a content in the range 0 to 50 mol %, N corresponds to an element from among Mn, Cr, Co, and y represents approximately one in content range 0 to 50 mol %; active and selective in the direct oxidation and/or internal reform of ethanol and ethanol-water mixtures and provides a structure, preferably, the perovskite type.

In a preferred realization of the catalyst, it presents the range of thermal stability up to 1400° C.

In a preferred realization of the catalyst is synthesized with the same molar concentrations of Ce:Al in the range of from 1:1 to 2:3.

In a preferred realization of the catalyst, it presents both catalytic and electrocatalytic functions for generating electricity by direct oxidation of ethanol and ethanol-water mixtures.

In a preferred realization of the catalyst, it has high activity for the internal reform of ethanol and ethanol-water mixtures, and can convert up to 100% ethanol.

In a preferred realization of the catalyst with same features and characteristic of acidic sites due to the dehydration of ethanol to ethylene.

In a preferred realization of the catalyst, it has high activity attributed to its high capacity to adsorb ethanol.

In a preferred realization of the catalyst, it presents the electronic conductivity and activity for fuel oxidation.

DETAILED DESCRIPTION OF THE INVENTION

Figure 1:
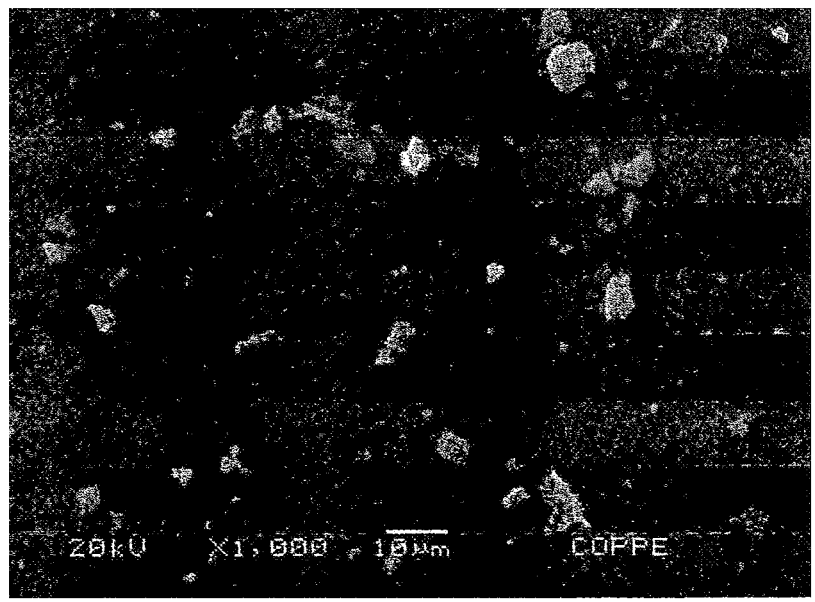
FIGS. 1(a)-(d) are micrographs of catalyst powder particles obtained by a scanning electron microscope showing a particle distribution with some agglomerates.
Figure 1:
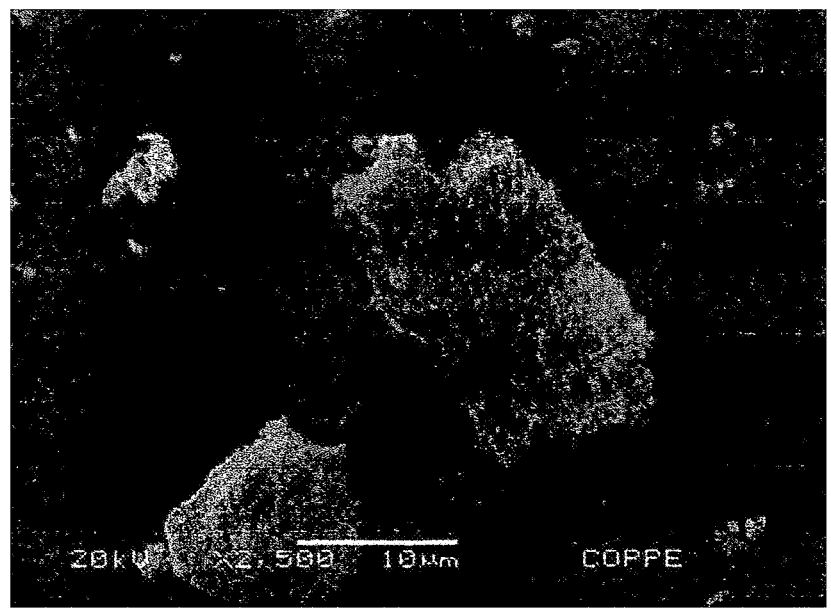
Figure 1:
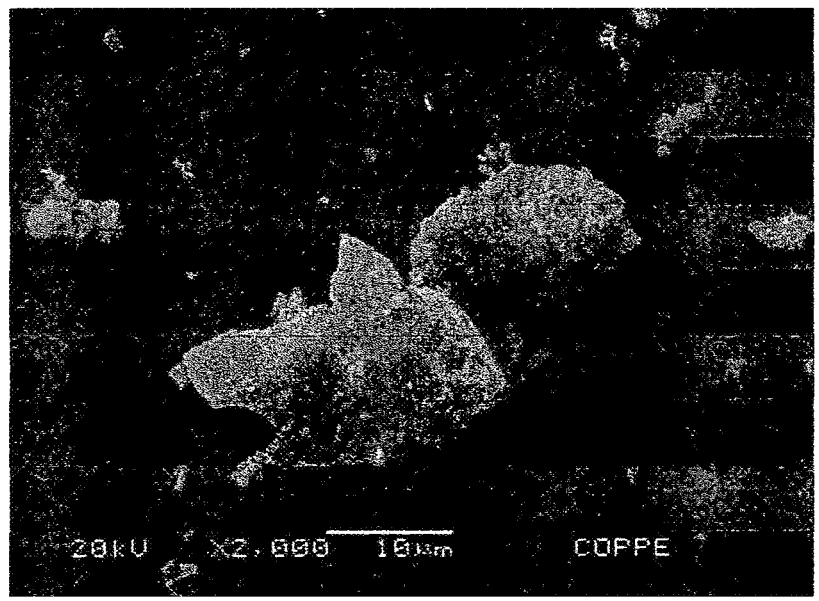
Figure 1:
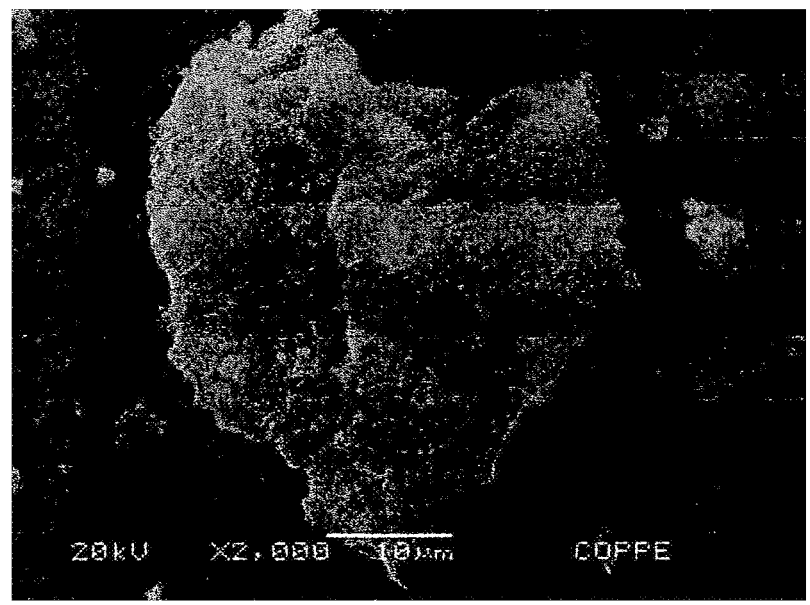

The present invention describes the use of fuel ethanol and ethanol-water mixtures in a reactor type solid oxide fuel cell—SOFC, with multifunctional electrocatalytic anode, the basis of oxides and mixed metal oxides with perovskite-type structure or not, to produce electricity, heat and chemicals.

For this purpose have been developed multifunctional anode electrocatalysts the basis of chemical composition of mixed oxides and oxides of metals such as copper (CuO and $CuO_2$), cerium ($CeO_2$), yttria stabilized zirconia ($Zr_2O_3$—$Y_2O_3$) and cerium aluminate ($Ce_{1-x}M_xAl_{1-y}N_yO_3$), where M corresponds to an element among Sr and Ca, and x represents about a content in the range 0 to 50 mol %, N corresponds to an element from among Mn, Cr, Co, and y represents approximately a content in the range 0 to 50 mol %, the stack is fed with ethanol to produce electricity, heat, water and eventually ethylene by direct oxidation and/or internal reform of complex fuels such as ethanol or ethanol-water mixtures.

The following experimental procedures are described as an example of methodology that was used to obtain catalysts and manufacture of multifunctional SOFC anodes in order to promote the direct oxidation and/or internal reforming of ethanol or ethanol-water mixtures.

The catalysts with perovskite-type crystal structure were obtained from the decomposition of amorphous citrate were used as precursors of nitrate solutions. Initially, he prepared an aqueous solution was heated under magnetic stirring, until it was observed the formation of a highly viscous system. Then, citrate formed was dried in an oven, pre-calcined and subsequently calcined.

For the manufacture of ceramic suspensions for anodes multifunctional $Ce_{1-x}M_xAl_{1-y}N_yO_3$—$Zr_2O_3$—$Y_2O_3$ the fuel cell unit solid oxide were used ZEI (zirconia stabilized with 8 mol % yttria) powders purchased commercially and $Ce_{1-x}M_xAl_{1-y}N_yO_3$-synthesized powders.

Different ceramic suspensions were prepared, whose compositions suggested can be seen in Table 1. Each of them was used for the deposition of a functional component of the anode and has a specific function. The first component promotes better adhesion of the anode to the electrolyte, the second is the anode itself, which promotes the catalytic activity for fuel oxidation. The third component is not obtained from ceramic suspension, this is formed by impregnation of Cu nitrate and is added primarily to promote better electronic conduction in the anode, but also has the advantage of not contributing to promote the deposition of carbon.

TABLE 1

Functional Components of Anodes

| Component Anode | Composition | Function |
|---|---|---|
| Functional layer 1 | 5-50% by weight of $Ce_{1-x}M_xAl_{1-y}N_yO_3$/95-50% by weight of ZEI | Promote better adhesion |
| Functional layer 2 | $Ce_{1-x}M_xAl_{1-y}N_yO_3$ | Anode |
| Element impregnated | Copper | Electronic conduction |

For the preparation of a ceramic suspension, to create a functional layer, the powders $Ce_{1-x}M_xAl_{1-y}N_yO_3$ and yttria-stabilized zirconia were thermally treated at temperatures in the range of 600-1000° C. and 700-1200° C., respectively. This initial heat treatment of powders is especially important to control the behavior of contraction that occurs during sintering, thus ensuring a better quality and reproducibility of the deposition and to control the particle size and distribution. Then, the powders were mixed, homogenized and heat treated.

Finally, the catalyst powder was mixed, a dispersant and a pore-forming ceramic suspension, added in proportions ranging from 5 to 60%. It generates a porous solid to facilitate the permeation of gases in the anode. Then the mixture was processed in a planetary ball mill (Retsch PM100) for the scattering of particles occurs by a mechanism of mechanical breakdown of the clusters.

In a subsequent step the suspension was prepared ceramic 2, to create the second functional layer, composed of only $Ce_{1-x}M_xAl_{1-y}N_yO_3$. The suspension was prepared by adding the catalyst powder, dispersant and 5-60% of the suspension forming pores in the grinding vessel and grinding media.

For the preparation of the anode, the ceramic suspensions were deposited by screen printing on the electrolyte of stabilized zirconia with 8 mol % yttria was deposited layer by layer. We first made the deposition of a layer using a ceramic suspension 1 then were deposited layer with the ceramic suspension 2. After that, the deposition was followed by a sintering heat treatment levels and rates of heating and cooling according to each specific catalytic material, resulting in a porous anode.

Subsequent to the step of sintering the porous anode was placed the third component of the anode, processed through the impregnation of copper nitrate. Cu salts were added to the anode using a series of steps of impregnation of an aqueous solution of copper nitrate ($Cu(NO_3)_{2.3}H_2O$) until the desired concentration. After each impregnation with copper nitrate, the anode passed through the drying process. Under these conditions the deposited copper salts were converted to copper oxides and reduced to metallic Cu on activation of SOFC under hydrogen atmosphere.

It experienced the manufacture of anodes containing the multifunctional components 1 and 2 described above with different thicknesses ranging from 10 to 600 µm, and repeating alternating deposition of these components before impregnation with the third component, composed of copper.

On the other side of the electrolyte was applied by screen printing functionality to the cathode gradually $La_{0.8}Sr_{0.2}MnO_{3+\delta}/Zr_2O_3$—$Y_2O_3$ (LSM/ZEI), the first layer consists of a functional film cathode LSM/ZEI (20-50/80-50% by mass) and a second cathode LSM ($La_{0.8}Sr_{0.2}MnO_3$), or any other composition of the cathode. Being sintered and then composing this way the combined electrode/electrolyte of a SOFC unit. For the collection of current in the anode and cathode wires were used for platinum and gold respectively.

The anode of the battery unit $La_{0.8}Sr_{0.2}MnO_{3+\delta}$—$Zr_2O_3$—$Y_2O_3/Zr_2O_3$—$Y_2O_3/Cu$—$Ce_{1-x}M_xAl_{1-y}N_yO_3$—$Zr_2O_3$—$Y_2O_3$ were reduced in $H_2$ atmosphere for a few hours prior to testing of SOFCs. To avoid the sintering of copper and maintain the electrochemical performance of anode functional tests were performed at temperatures between 600-950° C. Pure ethanol, hydrogen and mixtures of ethanol/water were used as fuels and oxidants were selected from air $O_2$ and pure $O_2$. The liquid fuel, ethanol was added to the system through a saturator and vaporized by using a thermostatic bath, being led by the carrier gas, nitrogen, until the surface of the anode multifunctional. It is worth mentioning that, under the reducing atmosphere during fuel cell operation, the main active component of multifunctional electrocatalytic anode is the lanthanum aluminate (Cu—$Ce_{1-x}M_xAl_{1-y}N_yO_3$ as described above). This becomes reversibly phases $CeO_2$ and $\gamma$-$Al_2O_3$ in an oxidizing atmosphere, outside the operating conditions of the fuel cell.

EXAMPLES

Example 1

This example shows the characteristics of the catalyst based on cerium aluminate (Cu—$Ce_{1-x}M_xAl_{1-y}N_yO_3$), where M corresponds to an element among Sr and Ca, and x represents about a content in the range 0 to 50 mol %, N corresponds to an element from among Mn, Cr, Co, and y represents approximately a content in the range 0 to 50 mol %. In this work the least amount of surface area found for the catalyst under study was 16.72 $m^2 \cdot g^{-1}$, when heat treated at 900° C. This value rises as the annealing temperature decreases and increases with increasing content of doping. These results are consistent with the average particle size, whereas the surface area decreases and the particle size increases with increasing annealing temperature. This observation may be related to the union between the particles for possible mass transfer of the material in question. The particle size distribution for the systems studied showed distribution bi and Trimode. This fact indicates the presence of clusters, with an open distribution. FIGS. 1 (a) to 1 (d) shows the micrographs of the catalyst powder particles obtained by scanning electron microscopy, to ascertain the distribution of particles with a few clusters.

Example 2

Figure 2:
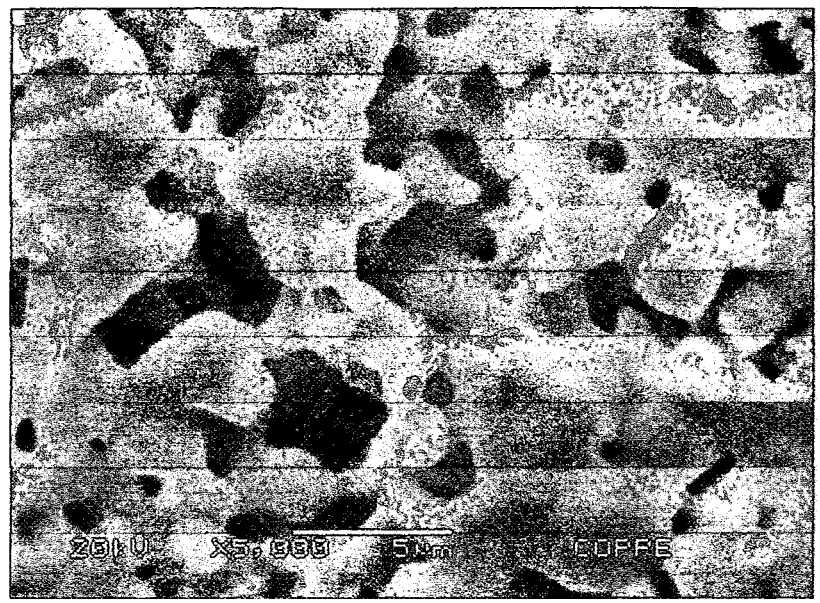
FIGS. 2(a)-(b) are micrographs showing the microstructure of a porous cerium aluminate anode sintered prior to impregnation with copper.
FIGS. 2(c)-(d) are micrographs showing copper oxide particle deposits produced by impregnation of a copper nitrate solution into the porous anode.
Figure 2:
Figure 2:
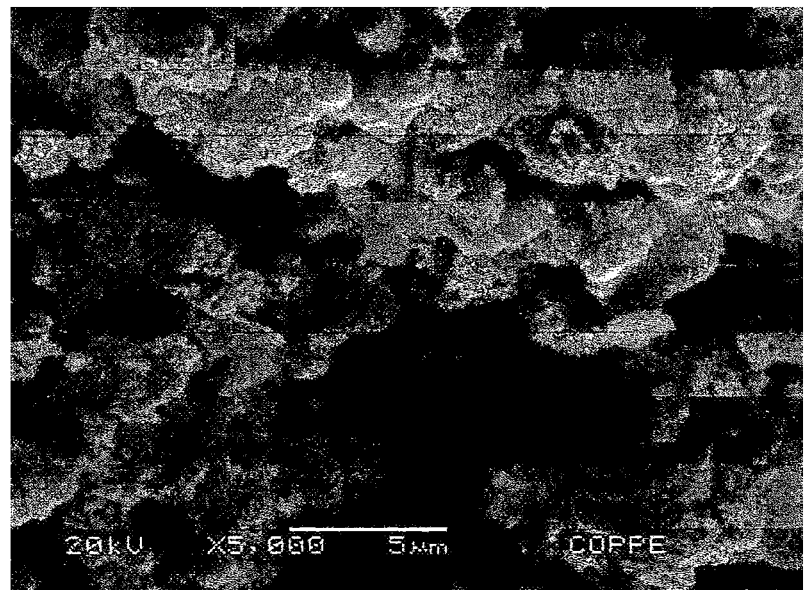
Figure 2:
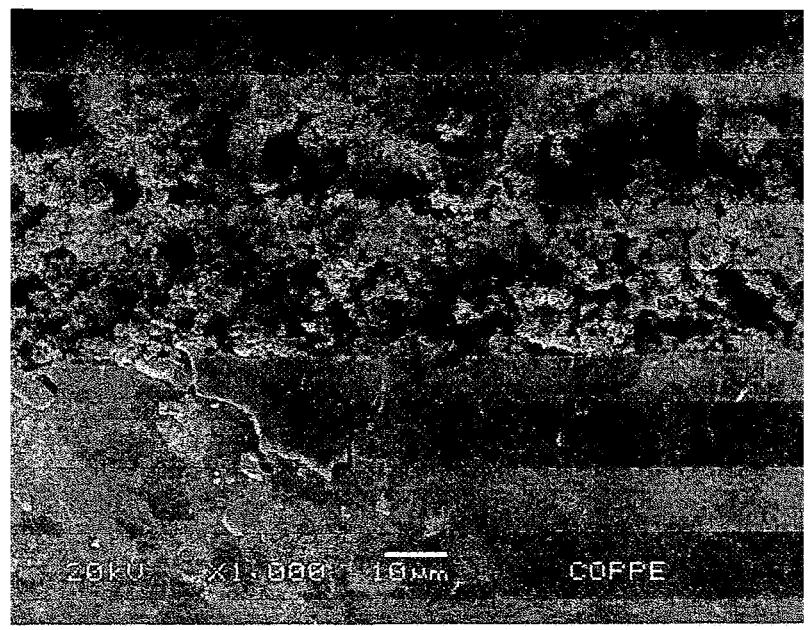

This example demonstrates the influence of the manufacturing process on the microstructure of the anode multifunctional electrocatalyzer the basis of chemical composition of mixed oxides and oxides of metals such as copper (CuO and $Cu_2O$), cerium ($CeO_2$), yttria stabilized zirconia ($Zr_2O_3$—$Y_2O_3$) and cerium aluminate (Cu—$Ce_{1-x}M_xAl_{1-y}N_yO_3$), where M corresponds to an element among Sr and Ca, and x represents about a content in the range 0 to 50 mol %, N corresponds to an element from among Mn, Cr, Co, and y represents approximately a content in the range 0 to 50 mol %. FIGS. 2 (a) and 2 (b) show the microstructure of the anode porous cerium aluminate (Cu—$Ce_{1-x}M_xAl_{1-y}N_yO_3$) sintered before impregnation with Cu. There is a significant amount of pores, resulting from the pyrolysis of ceramic suspension forming pores. It is also observed the formation of regions of high porosity throughout the sample, given that the micrographs show different regions of the same ceramic body, and the pores have approximately spherical shape, characterizing the shape of the pore-forming element. The impregnation with copper nitrate solution ($Cu(NO_3)_{2.3}H_2O$) on the porous anode produced a relatively large amount of Cu oxide precipitates probably formed during the evaporation of water during the drying process. The size and shape of the Cu oxide deposits depend on the size of the droplets of the solution during drying, resulting in particles of copper oxide, as shown in FIGS. 2 (c) and 2 (d). The precipitates were subsequently reduced to Cu metal in the operating conditions of SOFCs.

Example 3

Figure 3:
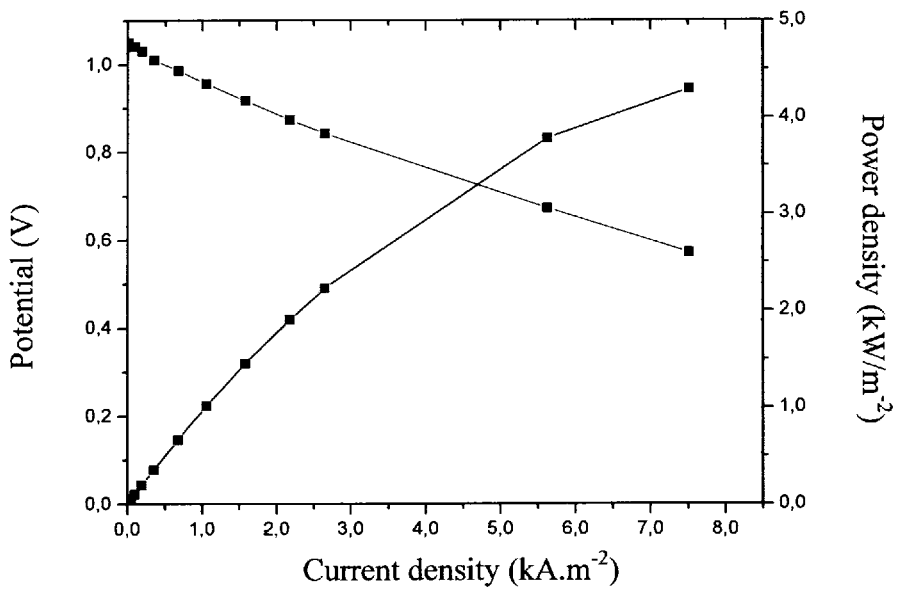
FIG. 3(a) is a graph of the performance of a solid oxide fuel cell generating electric energy when operated with hydrogen.
FIG. 3(b) is a graph of the performance of the solid oxide fuel cell generating electric energy when operated with ethanol or ethanol-water mixtures.
Figure 3:
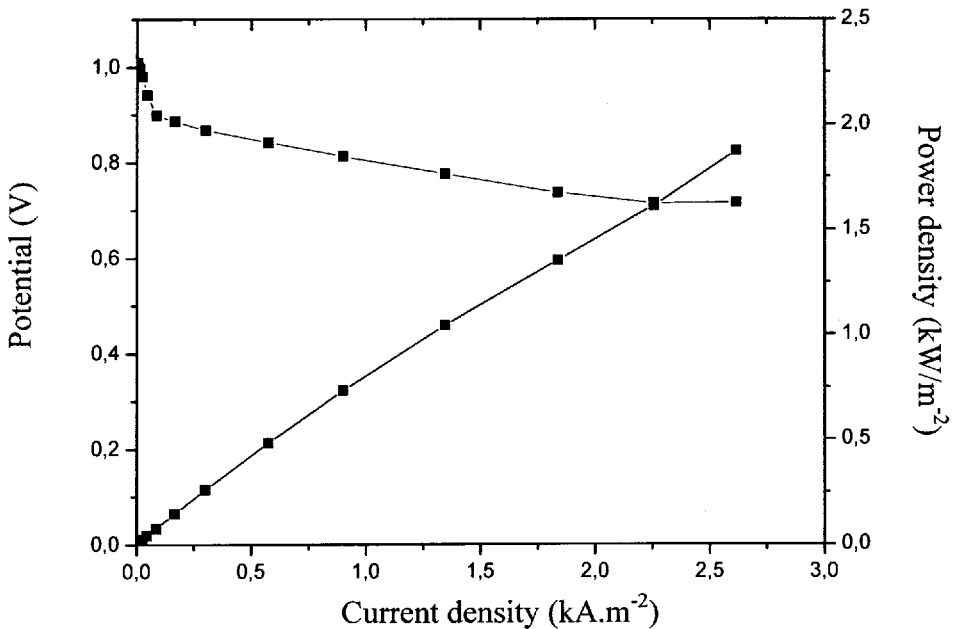

In the test conducted with the electrochemical performance SOFCs $La_{0.8}Sr_{0.2}MnO_{3+\delta}$—$Zr_2O_3$—$Y_2O_3/Zr_2O_3$—$Y_2O_3$/Cu—$Ce_{1-x}M_xAl_{1-y}N_yO_3$—$Zr_2O_3$—$Y_2O_3$, where M corresponds to an element among Sr and Ca, and x represents approximately a content in the range 0 to 50 mol %, N corresponds to an element among Mn, Cr, Co, and y represents approximately a content in the range 0 to 50 mol %. The fuel cell unit supported by an electrolyte with a thickness of 200 μm was efficient in generating electricity directly when operated with hydrogen or ethanol or ethanol-water mixtures, FIGS. 3 (a) and 3 (b), respectively. As expected, better results were obtained for operation with $H_2$, however, the performance of SOFCs operated with $C_2H_5OH$ was very significant given that there was no carbon deposit on the anode electrocatalyst. This leads to the conclusion that the tested SOFCs have a view to presenting long life with good performance during its operation with direct feed from ethanol or ethanol-water mixtures. This characterizes the components as strong candidates for direct oxidation of ethanol and hydrocarbons. The reduction in current density of SOFC operated with direct ethanol in relation to the SOFC operated with hydrogen can be related to greater weight of ethanol molecules, which induces slower diffusion of the fuel gas, increasing the concentration polarization. In addition, more complex electrochemical reactions take place at the anode of the fuel cell directly fed with ethanol.

The invention claimed is:

1. Process for the direct oxidation and/or internal reforming of ethanol fuel cells using solid oxide, comprising use of a fuel cell including a multifunctional electrocatalytic solid oxide anode having a chemical composition based on and cerium aluminate ($Ce_{1-x}M_xAl_{1-y}N_yO_3$), where M represents a chemical element selected from Sr and Ca; x represents a content in the range of approximately 0 to 50 mol %, N represents a chemical element selected from Mn, Cr and Co, and y represents a content in the range of approximately 0 to 50 mol %, the multifunctional electrocatalytic anode having a perovskite-type structure with a functional layer that is 100% $Ce_{1-x}M_xAl_{1-y}N_yO_3$ and a functional layer having a composition in the range of approximately 5-50% by weight of $Ce_{1-x}M_xAl_{1-y}N_yO_3$ and 95-50% by weight of yttria stabilized zirconia, and the fuel cell is fed with complex fuels, to produce electricity, heat, water and/or ethylene through direct oxidation and/or internal reforming.

2. Process according to claim 1, wherein the fuel supplied to the fuel cell is a liquid selected from ethanol, ethanol/water mixture or other alcohols.

3. Process according to claim 1, wherein the fuel cell is operated at a temperature ranging from 600 to 1000° C.

4. Process according to claim 1, wherein the fuel is ethanol that is oxidized directly or retired directly into the anode cell.

5. Process according to claim 1, wherein the fuel cell is operated with gas flow rates fuel/oxidant variables (0.5:1 to 3:1 and 2:1 to 1:3).

6. Process according to claim 1, wherein the electricity is generated simultaneously by means of electrochemical conversion of chemical energy into electrical energy with high efficiency during the oxidation of ethanol, producing 12 electrons of energy per mole of ethanol.

7. Process according to claim 1, wherein the fuel cell has high efficiency without the production of pollutants such as $NO_x$ and $SO_x$ and $CO_2$ emissions.

8. Process according to claim 1, wherein the fuel cell is operated with fuel that is vaporized and preheated.

9. Process according to claim 1, wherein the fuel cell is operated when the fuel to be introduced into the fuel cell solid oxide is at room temperature.

10. Process according to claim 1, wherein the fuel cell is operated directly with an ethanol/water mixture (mol) in a ratio ranging from 1:0 to 1:5.

11. Process according to claim 10, wherein the fuel cell produces hydrogen, both through the association of ethanol and water.

12. Process according to claim 1, wherein the fuel cell produces hydrocarbons such as ethylene by dehydration of ethanol.

13. A solid oxide fuel cell for direct oxidation and/or internal reforming of fuels, comprising a multifunctional electrocatalytic anode having a chemical composition based on cerium aluminate ($Ce_{1-x}M_xAl_{1-y}N_yO_3$), where M represents a chemical element selected from Sr and Ca, x represents a content in the range of approximately 0 to 50 mol %, N represents a chemical element selected from Mn, Cr, and Co, and y represents a content in the range of approximately 0 to 50 mol %, and the multifunctional electrocatalytic anode having a perovskite-type structure with a functional layer that is 100% $Ce_{1-x}M_xAl_{1-y}N_yO_3$ and a functional layer having a composition in the range of approximately 5-50% by weight of $Ce_{1-x}M_xAl_{1-y}N_yO_3$ and 95-50% by weight of yttria stabilized zirconia, wherein the fuel cell is fed with complex fuels for the production of electric energy, heat, water, and/or ethylene via an internal reforming and/or direct oxidation and dehydration.

14. The fuel cell according to claim 13, further comprising a cathode having a composition of $La_{0.8}Sr_{0.2}MnO_{3+\delta}$—$Zr_2O_3$—$Y_2O_3$ (LSM/YSZ), wherein a first layer of the cathode comprises a cathode LSM/YSZ (20-50/80-50 by mass %) and a second layer of the cathode comprises a LSM ($La_{0.8}Sr_{0.2}MnO_3$) cathode, and operates with oxidants selected from air, pure $O_2$ or other mixtures of $O_2$-rich gases, and the fuel cell further comprising an electrolyte that is YSZ (zirconia stabilized with 8% yttria) or other ion-conducting, gas-tight ceramic material, the fuel cell having an electrochemical performance that generates a maximum power density greater than 1.0 kW·m$^2$.

15. The fuel cell in accordance to claim 14, having at least one of the following configurations: supported by the electrolyte, by the anode or by the cathode.

16. The fuel cell according to claim 14, wherein the electrolyte is an oxygen $O^{2-}$ ion or $H^+$ proton-conducting electrolyte.

17. The fuel cell according to claim 14, wherein the electrolyte is in the form of a film, the fuel cell is not supported by the electrolyte and is operated at temperatures of 600 to 800° C.

18. The fuel cell according to claim 14, wherein the electrolyte supports the anode and cathode, or is deposited on the supporting anode or cathode, and the fuel cell is operated at temperatures from 700 to 1000° C.

19. The fuel cell according to claim 13, wherein the anode has electrochemical and electrocatalytic activity towards the direct oxidation of ethanol.

20. The fuel cell according to claim 13, wherein the anode has a catalytic, electrocatalytic or electrochemical multi-functionality, and is also able to limit the deposition of carbon.

21. The fuel cell according to claim 13, wherein the multifunctional anode has high electrochemical and electrocatalytic activity towards the internal reforming of ethanol.

22. The fuel cell according to claim 13, wherein the multifunctional anode has selectivity towards the production of hydrocarbons such as ethylene.

23. The fuel cell according to claim 13, wherein the fuel cell is directly fed with ethanol and/or an ethanol/water mixture, for generation of electricity.

* * * * *